(12) United States Patent
Hildebrand

(10) Patent No.: US 8,127,203 B2
(45) Date of Patent: Feb. 28, 2012

(54) METHOD, DATA PROCESSING APPARATUS AND WIRELESS DEVICE

(75) Inventor: Uwe Hildebrand, Nuremberg (DE)

(73) Assignee: Infineon Technologies AG, Neubiberg (DE)

( * ) Notice: Subject to any disclaimer, the term of this patent is extended or adjusted under 35 U.S.C. 154(b) by 1198 days.

(21) Appl. No.: 11/856,069

(22) Filed: Sep. 17, 2007

(65) Prior Publication Data
US 2009/0077417 A1   Mar. 19, 2009

(51) Int. Cl.
*G11C 29/00* (2006.01)
*G06F 12/14* (2006.01)

(52) U.S. Cl. ......... 714/766; 714/763; 713/193; 713/194
(58) Field of Classification Search .......... 714/766, 714/763; 713/193, 194
See application file for complete search history.

(56) References Cited

U.S. PATENT DOCUMENTS

| | | | |
|---|---|---|---|
| 5,459,742 A * | 10/1995 | Cassidy et al. ............... | 714/769 |
| 5,748,886 A * | 5/1998 | Hijii ............................. | 714/49 |
| 7,356,668 B2 * | 4/2008 | Morais et al. ................. | 711/211 |
| 7,447,950 B2 * | 11/2008 | Takahashi et al. ............ | 714/702 |
| 7,529,987 B2 * | 5/2009 | Jochemsen et al. ........... | 714/718 |
| 2004/0073846 A1 * | 4/2004 | Nakanishi et al. ............. | 714/42 |
| 2006/0015753 A1 * | 1/2006 | Drehmel et al. ............. | 713/193 |
| 2006/0080553 A1 * | 4/2006 | Hall .............................. | 713/189 |
| 2007/0294496 A1 * | 12/2007 | Goss et al. .................... | 711/163 |
| 2008/0232581 A1 * | 9/2008 | Elbaz et al. .................... | 380/42 |

OTHER PUBLICATIONS

Gopalan Sivathanu, et. al.:, Ensuring Data Integrity in Storage: Techniques and Applications, Computer Science Department, 2005, pp. 11, Stony Brook University, NY11794, US.

* cited by examiner

Primary Examiner — John J Tabone, Jr.

(57) ABSTRACT

Embodiments of the invention relate generally to a method, to a data processing apparatus and to a wireless device. In an embodiment of the invention a data processing apparatus is provided. The data processing apparatus may include a chip-integrated unit to select a check location of an external memory and to generate a check value, an internal memory associated with the chip-integrated unit, the internal memory to save the check location and the check value, and an external memory coupled to the chip-integrated unit, the external memory to store the check value at the check location.

24 Claims, 3 Drawing Sheets

METHOD, DATA PROCESSING APPARATUS AND WIRELESS DEVICE

TECHNICAL FIELD

Embodiments of the invention relate generally to a method, to a data processing apparatus and to a wireless device.

DETAILED DESCRIPTION OF THE INVENTION

Figure 1:
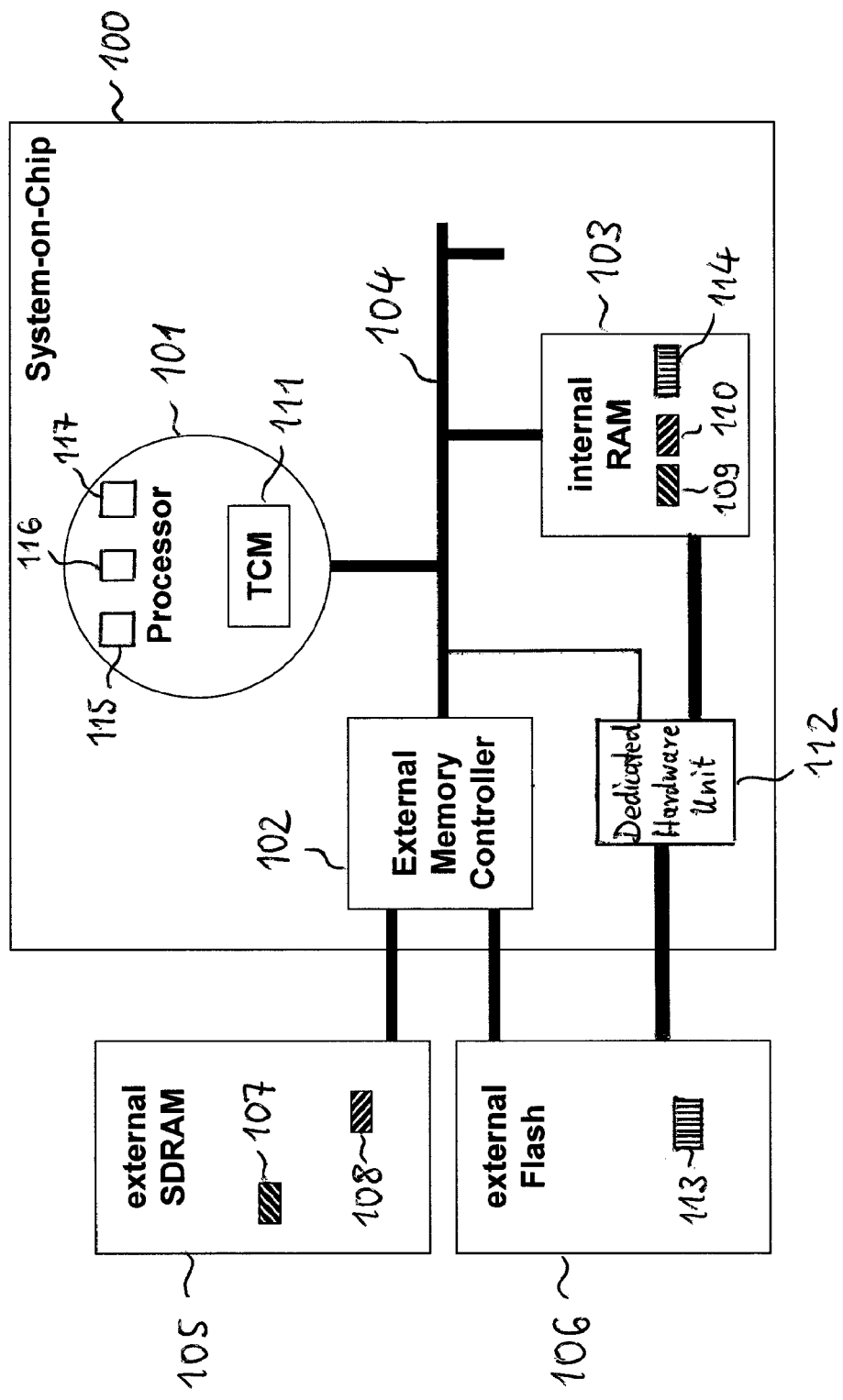
FIG. 1 shows a block diagram of a data processing apparatus in accordance with an embodiment of the invention.

The following detailed description explains exemplary embodiments of the present invention. The description is not to be taken in a limiting sense, but is made only for the purpose of illustrating the general principles of the invention. The scope of the invention, however, is only defined by the claims and is not intended to be limited by the exemplary embodiments described below.

When the integrity of data in a memory has to be ensured, for example if a software which should only be executed if it contains the correct code from a trusted source is stored in an external memory chip which may be targeted by manipulating attacks, it is generally desirable to use methods and implementations which allow a fast detection of an integrity violation at low cost.

In an embodiment of the invention, the proposed concept to realize a save wake-up method assuring integrity of data stored in an external memory is to always use newly generated random data to calculate a currently valid Check Value to be written to external memory as well as a currently valid Check Location on external memory. As a consequence Check Values and Check Locations will be different for each individual sleep phase. Keeping these data also in internal memory during sleep phases allows verifying the correctness of Check Values on external memory at wake-up after a sleep phase by simple comparison.

In accordance with an embodiment of the invention, a method is provided comprising selecting a check location of an external memory, generating a check value, saving the check location and the check value in an internal memory and storing the check value at the check location in the external memory.

In accordance with another embodiment of the invention, a data processing apparatus is provided comprising a chip-integrated unit to select a check location of an external memory and to generate a check value, an internal memory associated with the chip-integrated unit, the internal memory to save the check location and the check value and an external memory coupled to the chip-integrated unit, the external memory to store the check value at the check location.

This has the effect that a straight-forward and particularly fast implementation for detection of integrity destroying attacks on an external memory where security sensitive data are stored is possible at rather low cost.

This has the further effect that repeated fast integrity checks during runtime are possible which may even be performed during each wake-up initialization procedure after repeated short sleep mode phases of a processor system without significant loss of system performance. It will also be possible to perform fast integrity checks during runtime when the processor system makes a transition from a busy mode to an idle mode or vice versa.

In an embodiment of the invention, the selecting includes generating an address which is within an address space of the external memory and/or the saving includes saving an address specifying the check location.

In an embodiment of the invention, the selecting includes randomly selecting the check location of the external memory and/or the generating includes randomly generating the check value.

In an embodiment of the invention, reading an original content from the check location prior to the storing the check value at the check location in the external memory is included. An embodiment may further include saving the original content in an internal memory. Another embodiment may further include restoring the original content at the check location.

In an embodiment of the invention, reading a check content from the check location after the storing the check value at the check location in the external memory is included. An embodiment may further include comparing the check content to the check value.

In an embodiment of the invention, initializing a wake-up from a sleep mode is included.

In an embodiment of the invention, the initializing the wake-up from the sleep mode is performed after the saving the check location and the check value in the internal memory and after the storing the check value at the check location in the external memory and further the reading the check content is performed after the initializing.

In an embodiment of the invention, verifying whether the check value stored at the check location in the external memory has been changed during the sleep mode is included.

In an embodiment of the invention, using a plurality of check locations and a plurality of check values is included.

In an embodiment of the invention, the chip-integrated unit includes a microprocessor. In another embodiment of the invention, the chip-integrated unit includes a dedicated hardware unit.

In an embodiment of the invention, the chip-integrated unit includes an address generator to generate an address which is within an address space of the external memory. In another embodiment of the invention, the internal memory is further to save an address specifying the check location.

In an embodiment of the invention, the chip-integrated unit includes a random number generator.

In an embodiment of the invention, a chip-integrated compare unit is included to compare a check content read from the check location to the check value.

Referring to FIG. 1, a block diagram of a data processing apparatus in accordance with an embodiment of the invention is explained further.

An exemplary system configuration is shown here. A system-on-chip 100 includes a microprocessor 101, an memory controller 102 to control an external memory, an internal RAM 103 and a bus structure 104. The microprocessor 101, the memory controller 102 and the internal RAM 103 are coupled to each other via the bus structure 104. An external Synchronous Dynamic Random Access Memory (SDRAM) 105 and an external flash memory 106 are provided separate from the system-on-chip 100. Both the SDRAM 105 and the flash memory 106 are independently coupled to the memory controller 102. In the system configuration of FIG. 1, some program code to be loaded from the external SDRAM 105 and some program code to be loaded from the external flash memory 106, for example a NAND flash memory, needs to be executed.

The integrity of system software placed on and executed from external memory, for example a flash memory or a SDRAM, is checked during a secure system boot sequence. This will ensure that only correct code from a trusted source is executed on the system. Signed software images may be used for this purpose. In this case a software image is hashed and the resulting hash digest is signed. The integrity of a software image on the target system is then checked by hashing the software image placed on external memory and comparing the calculated hash digest against the provided singed target hash result.

A detection of attacks on external memory during sleep phases of the processor system is needed as well. Due to power efficiency reasons sleep phases should be as long as possible and the wake-up itself should be as fast as possible. Depending on the size of the software image the procedure used during a secure system boot sequence may require considerable amount of time—even when using hardware accelerators. Therefore it is not well suited for wake-up after sleep mode.

The envisioned threat scenario to be solved by the proposed save wake-up procedure is that during a sleep phase either an external memory chip itself is replaced or the content of an external memory chip (in particular the software image on external memory) is tampered.

Integrity verification of system software stored in the external memory may be done in several ways.

1) Software image integrity verification: Checksum and/or signature of a software image are verified before the contained code is executed. The major drawback with respect to using such a method at wake-up is the amount of calculations and ultimately the required time for performing such a type of image integrity checking.

2) Checking of unique chip identifier: Some memory chips implement a unique device identifier, which may be checked during wakeup. However, not all types of applicable external memory devices provide a unique chip identifier. Only replacement of the external memory device can be detected, not the replacement of a software image on the same device.

3) Integrating memory into package: If the memory containing the system software image is integrated in the same package with the central System-on-chip (SoC) device, then attacks on that memory are generally very difficult. However, there are also hardware platform configurations with non-integrated, external memory, for which a suitable method of assuring integrity is needed.

4) Usage of secret code words: In an embodiment of the invention, secret code words (Check Values) are placed at secret memory locations (Check Locations) and the presence of correct code words is checked. In this embodiment, code words and their locations are more or less predefined or fixed. This could make it possible to perform offline extensive trial-and-error attempts for revealing the secret information. Once being successful, this information can be used to introduce a prepared tampered software image during a sleep phase.

5) Detect external memory attacks during sleep phases using random data placed randomly on external memory: In an embodiment of the invention, each time before entering sleep mode, random information (single or multiple Check Values) is written to random locations on external memory (single or multiple Check Locations). In other words, in this embodiment random Check Values are used instead of fixed code words and random Check Locations are used instead of fixed addresses or locations for code words. Duplicates of this data (Check Values and Check Locations) are also saved to internal memory in order to allow subsequent checking during wake-up from sleep. The wake-up procedure verifies that the correct Check Value(s) are still present at the Check Location(s). The original content(s) of the Check Location(s) is saved prior to writing the Check Value(s) and later on restored after having verified the Check Value(s).

This has the effect that by randomly choosing Check Values and Check Locations for each individual sleep phase during system runtime, the corresponding memory contents will look differently for each sleep phase. A potential attacker will neither know in advance the values nor the locations used for checking external memory attacks. That makes it practically impossible to prepare a suitable tampered software image for introducing it in the system during a sleep phase—either using the same or a different external memory device.

In one example illustrated in FIG. 1, two Check Values are written to two Check Locations 107 and 108 in the external SDRAM 105. Check Locations 107 and 108 and the corresponding Check Values are randomly selected for each individual sleep phase. The Check Values, addresses of Check Locations and the original contents of the Check Locations are saved and preserved during sleep mode at locations 109 and 110 in the internal RAM 103. Alternatively, these data may be saved in the tightly coupled memory (TCM) 111 which is accessible by the microprocessor 101. In general, these data may be saved in any kind of on-chip memory or any register of the system-on-chip 100.

In another example illustrated in FIG. 1, the system-on-chip 100 includes a dedicated hardware unit 112 which is coupled to the external flash memory 106 (direct coupling shown here) and/or to the external SDRAM 105 (direct coupling not shown here). The dedicated hardware unit 112 is also coupled to the internal RAM 103. It may as well be coupled to the bus structure 104. The dedicated hardware unit 112 is adapted to select a Check Location 113 of an external memory (here shown for the case of the external flash memory 106) and to generate a Check Value. The dedicated hardware unit 112 is adapted to control writing the Check Value to the Check Location 113 of the external memory. The Check Value, address of Check Location and the original contents of the Check Location are saved and preserved during sleep mode at location 114 in the internal RAM 103. Alternatively, these data may be saved in the tightly coupled memory (TCM) 111 which is accessible by the microprocessor 101. In general, these data may be saved in any kind of on-chip memory or any register of the system-on-chip 100.

A method according to an embodiment of the invention can be implemented purely in software to be executed by a microprocessor 101. This allows for a very fast and straight-forward implementation. There are no extra hardware costs. Alternatively or additionally, a dedicated hardware unit 112 can perform steps of a method according to an embodiment of the invention.

The dedicated hardware unit 112 may also be adapted to save the Check Location and/or the Check Value in the dedicated hardware unit 112 itself, for example in one or more hardware registers of the dedicated hardware unit 112, or in one or more separate hardware registers of the system-on-chip 100.

Furthermore, functions of the dedicated hardware unit 112 (selecting a Check Location 113 of an external memory, generating a Check Value, saving the Check Location and the Check Value in an internal memory, storing the Check Value at the Check Location 113 in the external memory) can be controlled via hardware-to-hardware signals by a hardware sleep/wake-up sequencing unit which may be included in the dedicated hardware unit 112 or may be a separate unit of the system-on-chip 100.

This has the effect, that all steps of a method according to an embodiment of the invention can be executed under hardware control. Selecting a Check Location 113 of an external memory, generating a Check Value, storing the Check Value at the Check Location 113 and saving the Check Location and the Check Value internally can be controlled and executed purely by hardware. Also a verifying after wake-up from a sleep mode phase, whether the Check Value stored at the Check Location 113 in the external memory has been changed during the sleep mode, can be performed completely under hardware control. This has the effect of a further increased security regarding the detection of attacks on external memory during sleep phases of the processor system.

Embodiments of the invention may include an address generator 115 to generate an address which is within an address space of the external memory, a random number generator 116 and/or a chip-integrated compare unit 117 to compare a check content read from the check location to the check value. While the address generator 115, the random number generator 116 and the chip-integrated compare unit 117 are shown in FIG. 1 to be included in the microprocessor 101 as an example, it is contemplated by the inventor that one or more of these units can also be associated with or included in the dedicated hardware unit 112 or realized elsewhere in the system-on-chip 100.

Any part of the complete external memory 105 and 106 can be used for placing Check Values as the original contents will be saved and restored. Any part of the complete internal memory 103 and 111 can be used to save Check Values, addresses of Check Locations and the original contents of the Check Locations.

Figure 2:
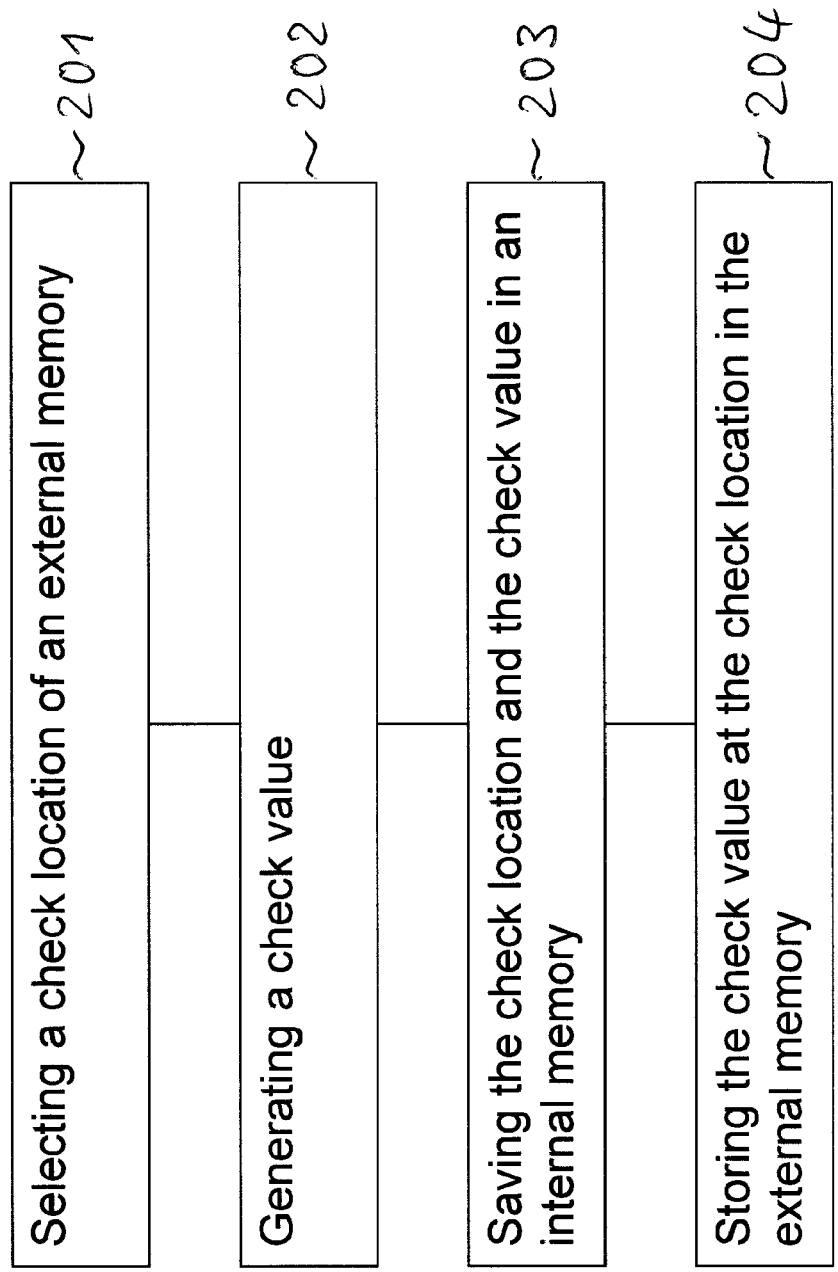
FIG. 2 shows a method in accordance with an embodiment of the invention.

FIG. 2 shows a method in accordance with an embodiment of the invention.

In 201, a check location of an external memory is selected.

In 202, a check value is generated.

In 203, the check location and the check value are saved in an internal memory.

In 204, the check value is stored at the check location in the external memory.

Figure 3:
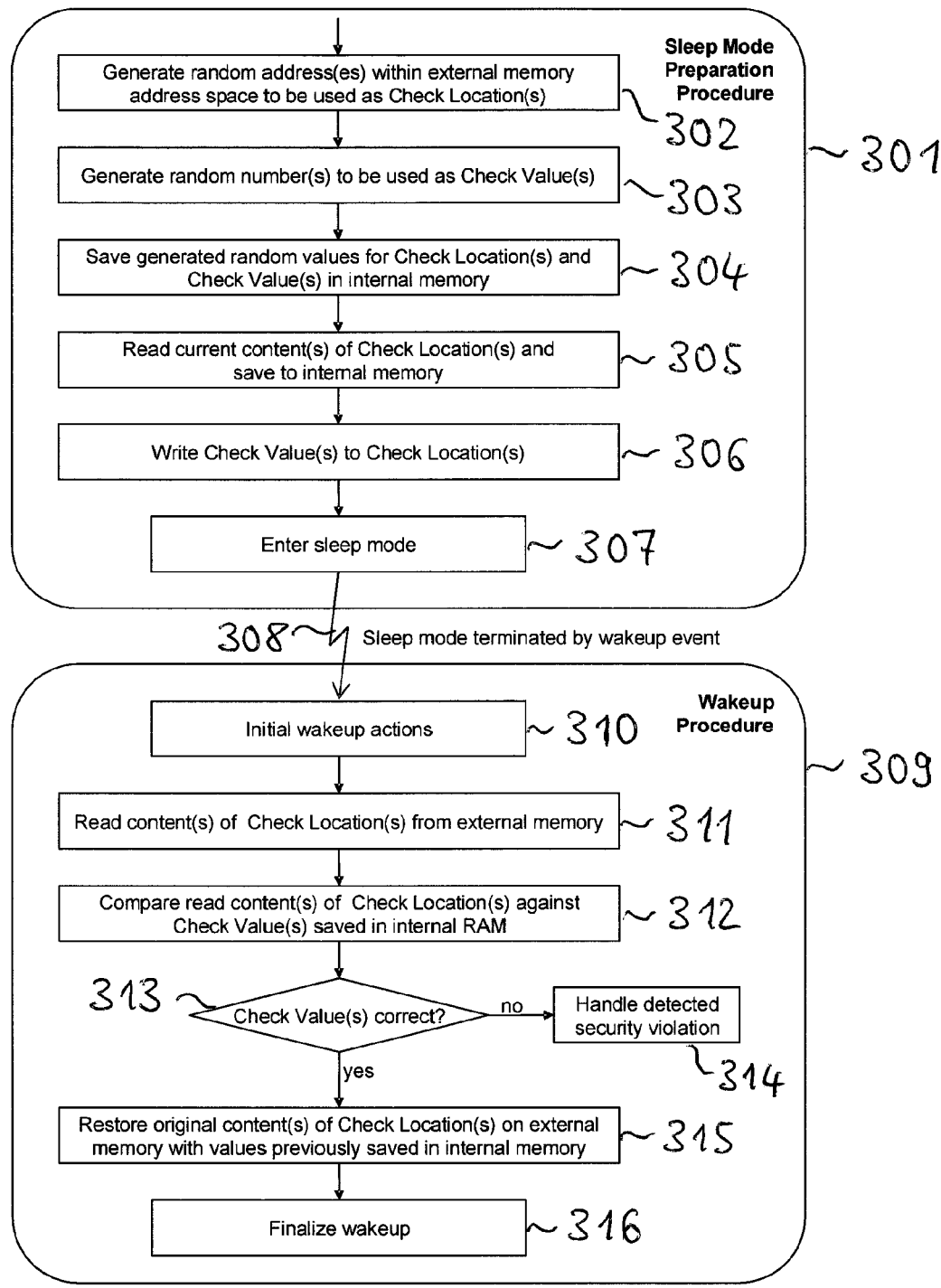
FIG. 3 shows a more detailed flow diagram of a method in accordance with an embodiment of the invention.

Referring to FIG. 3, a more detailed flow diagram of a method in accordance with an embodiment of the invention is explained further.

In this embodiment of the invention a save wake-up method is described and explained further referring to the flow diagram which shows how the save wake-up concept can be integrated into sleep mode preparation and wake-up procedures, respectively.

The sleep mode preparation procedure 301 is executed each time the system shall be brought into a sleep mode. Here the Check Locations and Check Values are newly determined every time before actually entering sleep mode. Then the following data are saved in internal memory:
1. Currently used addresses for Check Locations,
2. Copy of original (instantaneous) contents at memory addresses used as Check Locations,
3. Currently used Check Values at Check Locations.

In 302, one or more random addresses, which are within an address space of the external memory, for example the SDRAM 105, are generated. This may be achieved by mapping a number range onto the address space (or a part of the address space) of the external memory and randomly selecting a number from this range which then corresponds to a randomly selected address. These addresses are to be used as Check Locations 107, 108 and 113. In 303, random numbers are generated to be used as Check Values. In 304, the generated Check Values and the addresses are saved in an internal memory. In 305, the current (original) content of the Check Locations, which needs to be preserved as part of the data or instructions which are stored in the external memory, is read and saved to internal memory. In 306, the Check Values are written to the Check Locations. In 307, the sleep mode of the system is entered.

When a wake-up event 308 causes termination of a sleep mode phase, the wake-up procedure 309 will be executed in order to bring the system into operational mode again. Here the correctness of the Check Values on external memory is verified by comparing them with the saved values in internal memory. Also the original contents at the Check Locations are restored. If the verification of Check Values fails, then this security violation will be handled in a defined manner, for example by resetting or powering down the system.

In 310, initial wake-up actions are performed. In 311, the current (check) content of the Check Locations 107, 108 and 113 is read from the external memory. In 312, the read content (check content) of the Check Locations is compared to the previously (in step 306) saved Check Values, which are now retrieved from internal memory, for example the RAM 103 or the TCM 111. In 313, a decision is made, whether the check content (read from the external memory) is identical to the Check Values (read from the internal memory). If this is not the case, in 314 a security violation is observed and appropriate security measures are taken. Accordingly the wake-up procedure is not finalized. Otherwise, in 315 the original content of the Check Locations, this means the data or instructions which were stored there before they have been overwritten by the Check Values, is restored using the data which have been saved in internal memory in step 305. In 316, the wake-up procedure is finalized.

The code for the sleep mode preparation procedure 301 and the wake-up procedure 309—at least those parts related to the proposed save wake-up method—will be located in and executed from internal memory 103 and 111. This has the effect to avoid that a save wake-up implementation could be bypassed with a tampered software image that is executed directly at wake-up.

For implementation of save wake-up according to an embodiment of the invention basically only a few memory accesses and compare instructions need to be added to a standard wake-up procedure, which has the effect that the introduced extra time for save wake-up is almost negligible.

The following implementation options are available for the proposed save wake-up concept:

The number of Check Locations (and consequently Check Values) can be selected as suitable or desired.

The address range(s) on external memory within which random Check Locations are calculated can be defined as needed. This allows placement of Check Values close to or within those address regions on external memory that actually contain the code that will be executed after wake-up.

Any internal RAM type of memory that retains its data during sleep mode can be used for storing the data needed for the proposed save wake-up method.

External memory to be protected with the save wake-up method can be of volatile type, for example SDRAM, or of non-volatile type, for example NOR flash memory.

The proposed save wake-up method is applicable for a wide and complete range of hardware configurations including different types of external and internal memories. It covers detection of attacks on an external memory device itself as well as on a software image stored on external memory.

The invention claimed is:

1. A method, comprising:
   selecting a check location of an external memory;
   generating a check value;
   saving the check location and the check value in an internal memory; and
   storing the check value at the check location in the external memory.

2. The method as recited in claim 1, wherein the selecting includes generating an address which is within an address space of the external memory.

3. The method as recited in claim 1, wherein the selecting includes randomly selecting the check location of the external memory.

4. The method as recited in claim 1, wherein the generating includes randomly generating the check value.

5. The method as recited in claim 1, wherein the saving includes saving an address specifying the check location.

6. The method as recited in claim 1, further comprising reading an original content from the check location prior to the storing the check value at the check location in the external memory.

7. The method as recited in claim 6, further comprising saving the original content in an internal memory.

8. The method as recited in claim 6, further comprising restoring the original content at the check location.

9. The method as recited in claim 1, further comprising reading a check content from the check location after the storing the check value at the check location in the external memory.

10. The method as recited in claim 9, further comprising comparing the check content to the check value.

11. The method as recited in claim 9, further comprising initializing a wake-up from a sleep mode.

12. The method as recited in claim 11, wherein the initializing the wake-up from the sleep mode is performed after the saving the check location and the check value in the internal memory and after the storing the check value at the check location in the external memory and further wherein the reading the check content is performed after the initializing.

13. The method as recited in claim 11, further comprising verifying whether the check value stored at the check location in the external memory has been changed during the sleep mode.

14. The method as recited in claim 1, wherein the method is performed using a plurality of check locations and a plurality of check values.

15. A data processing apparatus, comprising:
    a chip-integrated unit to select a check location of an external memory and to generate a check value;
    an internal memory associated with the chip-integrated unit, the internal memory to save the check location and the cheek value; and
    an external memory coupled to the chip-integrated unit, the external memory to store the check value at the check location.

16. The data processing apparatus as recited in claim 15, wherein the chip-integrated unit includes a microprocessor.

17. The data processing apparatus as recited in claim 15, wherein the chip-integrated unit includes a dedicated hardware unit to select the check location of the external memory.

18. The data processing apparatus as recited in claim 15, wherein the chip-integrated unit includes a dedicated hardware unit to generate the check value.

19. The data processing apparatus as recited in claim 15, wherein the chip-integrated unit includes a dedicated hardware unit to save at least one of the check location and the check value.

20. The data processing apparatus as recited in claim 15, wherein the chip-integrated unit includes an address generator to generate an address which is within an address space of the external memory.

21. The data processing apparatus as recited in claim 15, wherein the chip-integrated unit includes a random number generator.

22. The data processing apparatus as recited in claim 15, the internal memory further to save an address specifying the check location.

23. The data processing apparatus as recited in claim 15, further comprising a chip-integrated compare unit to compare a check content read from the check location to the check value.

24. A wireless device comprising a data processing apparatus as recited in claim 15.

* * * * *